United States Patent [19]

Weil

[11] 4,329,753
[45] May 18, 1982

[54] DEVICE FOR CLEANING SENSITIVE SURFACES OF SOLID BODIES

[76] Inventor: Peter Weil, Riesstr. 82, Munich, 50, Fed. Rep. of Germany

[21] Appl. No.: 151,697

[22] Filed: May 20, 1980

[30] Foreign Application Priority Data

May 29, 1979 [DE] Fed. Rep. of Germany ....... 2921758

[51] Int. Cl.³ .......................... C08G 77/04; G11B 3/58
[52] U.S. Cl. ............................... 15/104 A; 15/210 R; 528/30
[58] Field of Search ............ 15/1.5 A, 104 R, 104 A, 15/104.93, 104.94, 209 R, 210 R, 214, 218, 219; 528/30

[56] References Cited
U.S. PATENT DOCUMENTS

| | | | |
|---|---|---|---|
| 1,015,210 | 1/1912 | Rowley et al. | 15/219 |
| 2,242,947 | 5/1941 | Griffis | 15/209 R X |
| 2,258,547 | 10/1941 | Dodds | 15/210 R |
| 2,475,027 | 7/1949 | Johnson | 15/219 |
| 2,736,911 | 3/1956 | Larsen | 15/210 R |
| 2,964,771 | 12/1960 | Hornor | 15/219 X |
| 4,128,909 | 12/1978 | Kawabe | 15/104 A |

*Primary Examiner*—Edward L. Roberts
*Attorney, Agent, or Firm*—Toren, McGeady and Stanger

[57] ABSTRACT

A device for cleaning the sensitive surfaces of solid articles, such as phonograph records, optical devices or the like is formed from a kneadable material having the properties of a highly viscous liquid and providing a working surface which may be applied directly against the material, the working surface referably consisting of a high molecular weight diorganopolysiloxane containing boroxane groups.

3 Claims, 2 Drawing Figures

DEVICE FOR CLEANING SENSITIVE SURFACES OF SOLID BODIES

The present invention relates to a cleaning device and particularly a device which enables the sensitive surfaces of solid bodies, such as phonograph records, optical devices or the like to be cleaned without damage.

A variety of devices are known which are intended for cleaning sensitive surfaces. The simplest of such devices usually involves a dust brush, dust cloths or the like. It is also known to clean surfaces by pressing of adhesive tape thereupon and by subsequent pulling off of the adhesive surfaces whereby foreign matter or impurities may be caused to adhere to such adhesive surfaces thereby being removed from the surface to be cleaned.

However, virtually all known possibilities for cleaning sensitive surfaces involve the disadvantage that, because mechanical means are utilized such as brushes, dust cloths or the like, there exists the danger that during the cleaning operation fine dust particles will be brought into contact with the surface with sufficient force that scratches will be caused to develop on the surface to be cleaned. Additionally, dust may be pressed even more firmly into the surface, as for example might occur in the grooves of phonograph records.

The possibility of cleaning sensitive surfaces by means of adhesive tapes or the like also involves the additional disadvantage that an adhesive agent may be caused to remain upon the surface to be cleaned. Thus, during the cleaning process there may result an even greater contamination. Moreover, the production of adhesive type devices such as, for example, cleaning rollers and cylinders, as may be disclosed for example in U.S. Pat. No. 4,128,909, is relatively expensive.

Accordingly, the present invention is directed toward the provision of a device which will expediently clean foreign matter particles from sensitive surfaces and which will safely remove such particles without creating the danger that the surface will be harmed or that residues will remain on the surface.

SUMMARY OF THE INVENTION

Briefly, the present invention may be described as a device for cleaning sensitive surfaces of solid bodies such as phonograph records, optical devices or the like wherein the device is formed to comprise a working surface consisting essentially of a kneadable material having the properties of a highly viscous liquid.

The device of the present invention makes it possible to effectively clean sensitive surfaces, even irregular surfaces such as the surfaces of phonograph records, inasmuch as the working surface of the cleaning device is capable of adjusting to any shape or configuration and that it encloses and binds foreign matter thereby enabling such foreign matter to be effectively removed from a surface to be cleaned merely by lifting of the device.

Simultaneously, it is possible to remove foreign matter even from areas which cannot be reached by conventional means, for example from the edges of optical lenses. Likewise, difficult to reach areas such as mounts and threads of lens assemblies or other similar areas can be effectively cleaned.

By contrast to known devices which utilize a liquid in the cleaning process, the invention makes it possible to immediately reuse the cleaned surface, such as for example the surface of a phonograph record.

In a further development of the invention, the working surface is formed to consist of a high molecular weight diorganopolysiloxane containing boroxane groups. Such a silicone polymer is known for use as a therapeutic agent (Information Wackersilicone of Sept. 30, 1977). It has been found that such a material has a great absorbing power for dust and foreign matter and that it does not adhere to metal, glass, plastic material, lacquer or the like.

In a further embodiment of the invention, the device is formed throughout with the same material. For example, the cleaning device of the invention may be structured as a ball or in a spherical shape which may be rolled over a surface to be cleaned and which as a result of deformation will adjust to the surface of the body to be cleaned.

In a modification of the invention, the device is formed by a container which receives the material forming the working surface, with the working surface being exposed at least during a cleaning operation.

Depending upon the fluidity of the material forming the working surface, it may be advantageous to store the material in a special container.

Furthermore, it may be advantageous, as is also provided in accordance with the invention, to form the container to consist of a plastic material which may be deformed by a user. Thereby, the working surface which may be easily covered or closed by means of a cover, may be exposed or squeezed into an operative condition for application and use against a surface to be cleaned by deforming the container.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
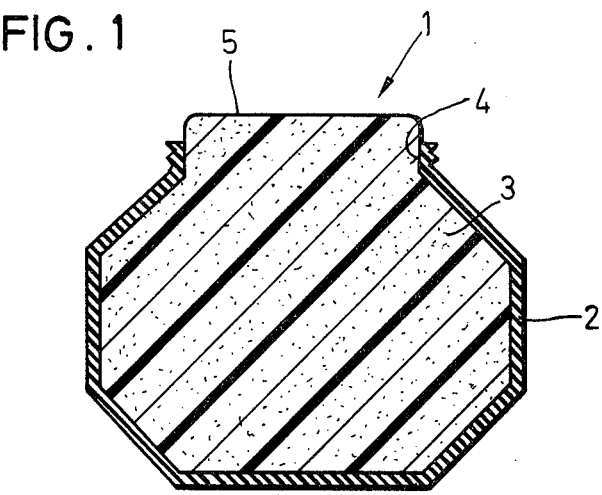
FIG. 1 is a sectional view taken through a device in accordance with the invention.

Referring now to the drawings, and particularly to FIG. 1, a device 1 for cleaning sensitive surfaces of solid bodies is illustrated as consisting essentially of a container 2 filled with a kneadable material 3. At the upper end of the container 2 there is formed an opening 4 which is adapted to be closed by means of a cover (not shown). The kneadable material 3 may be pressed outwardly through the opening 4 to an extent necessary such that a working surface 5 may be formed which may be brought into contact with a surface to be cleaned.

In order to enable the kneadable material 3 to fill the opening 4, the container 2 may be made of deformable material such as for example rubber or deformable plastic. However, the container may also be constructed in the form of a bag or the like.

Figure 2:
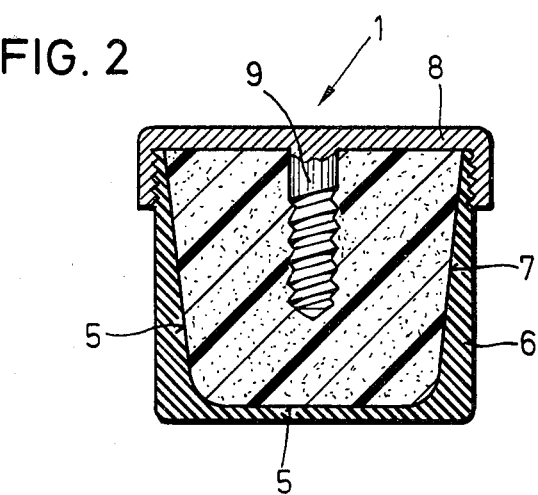
FIG. 2 is a sectional view taken through a second embodiment of the invention.

FIG. 2 shows a modification of the device 1 of the present invention. As illustrated in FIG. 2, a container 6 is formed with an inner wall 7 which has a slightly inwardly conically tapered or arched surface and to which the kneadable material 3 will not adhere. A cover 8 is equipped with a holding element which, for example, may be constructed in the form of a central threaded rod 9 so that after the cover 8 is removed the kneadable material may be withdrawn from the container 6 and may be formed in the shape of a cleaning cone or possibly as a spherical segment which may be applied against the surface to be cleaned.

Of course, it will be understood that the embodiments described above may be modified in several respects without departing from the fundamental concepts of the invention. The device is particularly not limited to shapes which are illustrated and it is also not limited to a specific application or purpose.

While specific embodiments of the invention have been shown and described in detail to illustrate the application of the inventive principles, it will be understood that the invention may be embodied otherwise without departing from such principles.

What is claimed is:

1. A device for cleaning sensitive surfaces of solid bodies, such as phonograph records, optical devices and the like comprising a material consisting essentially of a high molecular weight diorganopolysiloxane containing boroxane groups, said material being in the form of a kneadable substance having the properties of a highly viscous liquid, and container means for holding said material in an operative form having a working surface of said material adapted to be exposed for application to a surface to be cleaned.

2. A device according to claim 1 wherein said container means consists of a deformable material adapted to be deformed by a user in order to enable said material forming said working surface to be exposed for use.

3. A device according to claim 2 wherein said container means is formed to cooperate with a cover for covering said working surface.

* * * * *